(12) United States Patent
Krahnstoever et al.

(10) Patent No.: US 8,320,613 B2
(45) Date of Patent: Nov. 27, 2012

(54) DETECTING AND TRACKING TARGETS IN IMAGES BASED ON ESTIMATED TARGET GEOMETRY

(75) Inventors: Nils Krahnstoever, Schenectady, NY (US); Peter Tu, Niskayuna, NY (US); Gianfranco Doretto, Albany, NY (US); Perera Ambalangoda, Clifton Park, NY (US)

(73) Assignee: Lockheed Martin Corporation, Gaithersburg, MD (US)

( * ) Notice: Subject to any disclaimer, the term of this patent is extended or adjusted under 35 U.S.C. 154(b) by 917 days.

(21) Appl. No.: 12/155,438

(22) Filed: Jun. 4, 2008

(65) Prior Publication Data
US 2009/0304230 A1    Dec. 10, 2009

(51) Int. Cl.
*G06K 9/00*    (2006.01)
(52) U.S. Cl. ........................................ 382/103; 382/190
(58) Field of Classification Search .................. 382/103, 382/173; 702/94; 342/52, 54, 70, 53
See application file for complete search history.

(56) References Cited

U.S. PATENT DOCUMENTS

| 5,148,809 | A * | 9/1992 | Biegeleisen-Knight et al. ............................ 600/443 |
| 5,495,576 | A * | 2/1996 | Ritchey ......................... 345/420 |
| 6,594,600 | B1 * | 7/2003 | Arnoul et al. ................... 702/94 |
| 7,298,866 | B2 * | 11/2007 | Lee ............................... 382/103 |
| 7,356,425 | B2 * | 4/2008 | Krahnstoever et al. ......... 702/94 |
| 7,596,241 | B2 * | 9/2009 | Rittscher et al. .............. 382/103 |
| 7,719,568 | B2 * | 5/2010 | Hung et al. .................... 348/159 |
| 7,742,622 | B2 * | 6/2010 | Lee ............................... 382/103 |
| 8,026,842 | B2 * | 9/2011 | Fox et al. ........................ 342/52 |

FOREIGN PATENT DOCUMENTS
WO    WO 2006/099172 A1    9/2006

OTHER PUBLICATIONS

N. Krahnstoever et al., Multi-View Detection and Tracking of Travelers and Luggage in Mass Transit Environments, General Electric Global Research, One Research Circle, Niskayuna, New York 12309, XP-002538253, Proceedings 9*th* IEEE International Workshop on PETS, New York, Jun. 18, 2006, pp. 67-74.
Ying-Nong Chen et al., Face Detection and Authentication in a Large Space, Depart. Computer Science and Information Engineering, National Central University, R.O.C., 4 pages, Feb. 25, 2008.
Xuhui Zhou et al., A Master-Slave System to Acquire Biometric Imagery of Humans at Distance, Robotics Institute, Carnegie Mellon University, Pittsburgh, PA 15213, XP-002538254, pp. 113-120, Nov. 7, 2003.
Peter H. Tu et al., An Intelligent Video Framework for Homeland Protection, GE Global Research, One Research Circle, Niskayuna, New York, U.S.A., XP-002538255, 18 pages, Sep. 2008.

(Continued)

*Primary Examiner* — Chan S Park
*Assistant Examiner* — Nancy Bitar
(74) *Attorney, Agent, or Firm* — Oliff & Berridge, PLC (57) ABSTRACT

A system for detecting and tracking targets captured in images, such as people and object targets that are captured in video images from a surveillance network. Targets can be detected by an efficient, geometry-driven approach that determines likely target configuration of the foreground imagery based on estimated geometric information of possible targets. The detected targets can be tracked using a centralized tracking system.

25 Claims, 4 Drawing Sheets

OTHER PUBLICATIONS

Peter Tu et al., View Adaptive Detection and Distributed Site Wide Tracking, GE Global Research, Niskayuna, New York, XP-002538256, 2007 IEEE, pp. 57-62.

Luca Marchesotti et al., Dual Camera System for Face Detection in Unconstrained Environments, DIBE—University of Genoa, 2003 IEEE, pp. 681-684.

* cited by examiner

DETECTING AND TRACKING TARGETS IN IMAGES BASED ON ESTIMATED TARGET GEOMETRY

BACKGROUND

The present disclosure relates generally to devices and methods for detecting targets of interest in images, such as people and objects, and for tracking detected targets in video images.

A number of applications require the ability to detect people or objects in images. The ability to detect people or objects of a certain type can be useful in security, forensic, military applications, as well as for tracking people or objects in crowded environments such as mass transit and airports. In many surveillance applications, individuals or objects need to be tracked over a surveillance network encompassing different camera views. For example, in mass transit environments travelers and unattended or abandoned luggage can be detected and tracked in areas monitored by video cameras. The ability to detect and track people and objects can also be useful in alarm verification.

SUMMARY

Visual surveillance in mass transit environments can greatly aid the prevention, detection and investigation of crimes and accidents. The traditional operator-based surveillance of such environments can be very labor intensive due to the size of surveillance sites and the number of people involved. Accordingly, operator based surveillance can typically only be used as a forensic rather than a preventative or interjective tool.

Automatic surveillance using computer vision systems has the potential to provide a new level of continuous and proactive protection in surveillance environments. Surveillance of large scale environments, such as mass transit networks, can be problematic for several reasons. First large scale surveillance systems typically include thousands of camera views observing millions of travelers per week, or even per day. Additionally, for these environments, a computer vision system typically needs to be used with extremely crowded and hence occluded and cluttered environments, poorly lit environments, and views that are prohibitively narrow or wide.

Aspects of this disclosure can provide a detection and tracking framework that can be suitable for operating in very large scale environments. The scalability of the system can be achieved by a very efficient algorithm of detecting targets of different classes. The task of local target detection can be performed in each camera view, and can be separate from the tracking process which can be performed centrally in the ground plane.

According to one aspect of the present disclosure, there is provided a device for detecting predetermined targets that are captured within an image that is inputted from an image input device, where the target detection device includes a foreground/background classification device, a target geometry dictionary, and a target detection device. The foreground/background classification device can be configured to analyze the inputted image to determine a foreground probability image that represents a probability that pixels in the inputted image are part of the foreground. The target geometry dictionary can include precomputed geometric information of the predetermined targets. The target detection device can be configured to analyze the foreground probability image and determine a most likely target configuration of detected targets that corresponds to the foreground probability image based on at least the precomputed geometric information of the predetermined targets from the target geometry dictionary and based on geometric information of the image input device.

In another aspect, there is provided a method for detecting predetermined targets that are captured within an image that is inputted from an image input device, where the method includes analyzing the inputted image to determine a foreground probability image that represents a probability that pixels in the inputted image are part of the foreground, precomputing geometric information of the predetermined targets, and analyzing the foreground probability image and determining a most likely target configuration of detected targets that corresponds to the foreground probability image based on at least the precomputed geometric information of the predetermined targets and based on geometric information of the image input device.

According to another aspect, there is provided a target detection system for detecting predetermined targets, where the system includes a first image input device, a foreground/background classification device, a target geometry dictionary, a target detection device, a second image input device, and a classification device. The first image input device can be configured to obtain a first image including the predetermined targets. The foreground/background classification device can be configured to analyze the first image to determine a foreground probability image that represents a probability that pixels in the first image are part of the foreground. The target geometry dictionary can include precomputed geometric information of the predetermined targets. The target detection device can be configured to analyze the foreground probability image and determine a most likely target configuration of detected targets that corresponds to the foreground probability image based on at least the precomputed geometric information of the predetermined targets from the target geometry dictionary and based on geometric information of the first image input device. The most likely target configuration determined by the target detection device can include ground plane location information for each detected target. The second image input device can be configured to receive the ground plane location information of a detected target of interest from the target detection device and obtain a second image that captures the detected target of interest using the ground plane location information, where the second image can have a higher resolution than the first image. The classification device can be configured to receive the second image and classify the detected target of interest based on at least the second image.

In yet another aspect, there is provided a method for detecting and tracking predetermined people targets and object targets over a camera network to determine whether an object is dropped by a person, where the method includes analyzing an image captured by a camera to determine a foreground probability image that represents a probability that pixels in the inputted image are part of the foreground, precomputing geometric information for the predetermined people targets and object targets, analyzing the foreground probability image and determining a most likely target configuration of detected targets that corresponds to the foreground probability image based on at least the precomputed geometric information of the predetermined people targets and object targets and based on geometric information of the camera, such that the most likely target configuration includes a detected object target and a detected person target, determining whether the detected object target is associated with the detected person target, tracking the detected object target and the detected person target over the camera network if it is determined that the detected object target is associated with the detected person target, and determining that the detected object target has been dropped if the detected person target is subsequently tracked without the detected object target.

BRIEF DESCRIPTION OF THE DRAWINGS

Exemplary embodiments are described in detail below with reference to the accompanying drawings in which.

DETAILED DESCRIPTION OF EMBODIMENTS

Exemplary embodiments of the broad principles outlined herein are described with reference to the various drawings.

The methods, devices and systems described in the present disclosure can exploit knowledge about the camera geometry and the availability of a foreground/background classification. A device for detecting targets, such as people and objects, can operate on the foreground image in which each pixel denotes the discretized probability of seeing the foreground. An algorithm can determine at every frame an estimate of the most likely configuration of targets that could have generated the foreground image.

Figure 1:
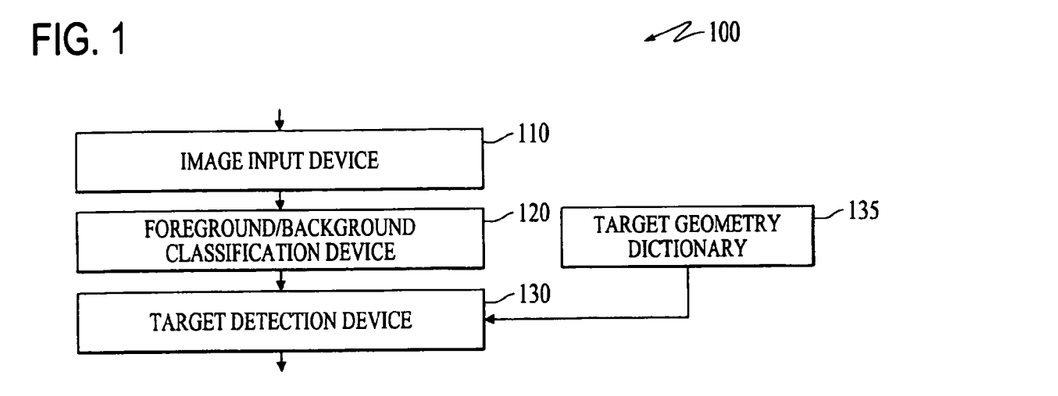
FIG. 1 is a block diagram of an exemplary device for detecting predetermined targets.

FIG. 1 shows a block diagram of an exemplary device 100 for detecting predetermined targets. The device 100 can include an image input device 110, foreground/background classification device 120, target detection device 130 and target geometry dictionary 135. During operation, the device 100 can receive an input, such as an image captured by a camera, and process the image to detect predetermined targets that are captured within the image. The device 100 can be configured to detect predetermined targets that are present in an image such as people and/or objects of a certain type, for example, luggage, vehicles, packages, and the like.

The image input device 110 can receive an inputted image, such as video images or still photos, and transmit the image to the foreground/background classification device 120.

The foreground/background classification device 120 can receive the inputted image and determine a foreground probability image from the inputted image. The foreground probability image represents the probability that pixels in the inputted image correspond to the foreground imagery. That is, the foreground probability image can denote the probability between $[0, \ldots, 1]$ of seeing the foreground image for each pixel. The foreground/background classification device can determine the foreground probability image by using any suitable method including, for example, frame differencing methods, background subtraction, and median filtering. Targets that are persistently present in the captured camera image ('ghosts') can be detected or patched to assimilate or initialize the ghost targets into the background.

In addition to conventional background/foreground classification techniques, the classification device can determine the foreground probability image by using appearance attributes of the foreground and background pixels. For example, a priori appearance models can be selected to filter out targets that may not be of interest, and to further improve the target detection process. For person detection, skin color classification algorithms can be used to further improve accuracy in detecting people. In this way, an upright person-sized box can be distinguished from a true observation of a person based on color or other appearance attributes. Additionally, in certain environments, analyzing the pixels based on appearance can improve the accuracy of the detection device. For example, in a prison environment where inmates wear orange uniforms, a person detection device that uses an a priori appearance model to extract orange targets may exhibit higher accuracy in detecting targets of interest (inmates) than traditional approaches. The foreground/background classification device 120 can output the foreground probability image to the target detection device 130.

The target detection device 130 can receive the foreground probability image from the foreground/background classification device 120, and determine a target configuration in the foreground probability image, where the target configuration identifies targets and their locations. The target detection device is provided with precomputed geometric information about the predetermined targets from target geometry dictionary 135. The target detection device can also be provided with geometric information of the image input device 110.

The target geometry dictionary 135 can include precomputed geometric information that is specific to a target class. For each class of targets that the detector considers, geometric information is precomputed and supplied to the target detection device 130. For example, adults can be considered to be ellipsoids having a predetermined height and radii, and children can be considered to be smaller ellipsoids. Thus, after projection from 3D to 2D, predetermined targets can be defined roughly by bounding boxes having height and width dimensions that are characteristic of the predetermined targets. Additionally, the bounding boxes used to define the geometry of the predetermined targets can be subdivided into several parts having geometries consistent with a particular part of the predetermined target. Thus, the accuracy of the target detection device can be improved because targets that are partially occluded in the foreground can be recognized.

The target detection device 130 can process the foreground probability image received from the foreground/background classification device 120 with a target detection algorithm that uses information based on at least the inputted geometric information from target geometry dictionary 135 to determine the most likely target configuration of the foreground imagery. The target detection device 130 can also use geometric information of the image input device 110 to determine the most likely target configuration. For example, the focal length, height, tilt and roll angle of the image input device 110 can be provided to the target detection device 130 so that the target detection device can operate in a calibrated camera environment. This improves the target detection accuracy and enables the ground plane locations of the detected targets to be identified. In general, perspective projection matrices with optional lens distortion field can be used to project 3D data into the 2D image plane. See, e.g., "Multiple View Geometry in Computer Vision" Richard Hartley and Andrew Zisserman, Cambridge University Press (June 2000).

As described in greater detail below, the target detection device 130 can use an algorithm based on rough approximations to determine a likely target configuration in the foreground pixels. The target detection device can then output the target configuration, which can include target identification and ground plane location.

In one embodiment, the algorithm that is used to determine a likely target configuration in the target detection device 130 is described below. A configuration of targets X with ground plane locations $(x_j, y_j)$ and target class labels $c_j \in C$, X can be defined as $X = \{X_j = (x_j, y_j, c_j), j = 0, \ldots, N_t\}$. Each target class in C can be predefined with geometric information, such as size and height information in the target geometry dictionary 135. The target is assumed to be composed of several parts. $O_{c,k}$ represents the part k of target class c. When a target configuration X is projected into the image, a label image $O[i] = (c_i, k_i)$ can be generated where each location in the image i indicates which part $k_i$ and class $c_i$ is visible at that location. If no part is visible, $O[i] = BG$, which is a label indicating that the location is part of the background.

The probability of the foreground image F at time t can be defined as:

$$p(F_t | X) = \prod_{allvalid(c,k)} \left[ \prod_{\{i | O[i] = (c,k)\}} p(F_t[i] | O[i]) \right] \qquad (1)$$

$$\prod_{\{i | i \in BG\}} p(F_t[i] | i \in BG). \qquad (2)$$

The above product has as many $p(F_1 | \ldots)$ terms as there are pixels in the foreground image $F_t$. The above probability can be rewritten as a likelihood:

$$L(F_t | X) = \sum_{allvalid(c,k)} \left[ \sum_{\{i | O[i] = (c,k)\}} \log \frac{p(F_t[i] | O[i])}{p(F_t[i] | i \in BG)} \right] \qquad (3)$$

$$\sum_{\{i | i \in BG\}} \log p(F_t[i] | i \in BG), \qquad (4)$$

where the background BG and hence the last term in the equation does not depend on X, unlike O[i], which is dependent on X. Thus, the above term can be simplified to:

$$L(F_t | X) = \sum_{\{i | O[i] \neq BG\}} h_{O[i]}(F_t[i]). \qquad (5)$$

where h(c, k)(p) is a histogram of the likelihood ratios for part k of target class c given foreground pixel probabilities p.

To detect predetermined targets, the target configuration X that maximizes Equation 5 can be determined. However, to allow real-time execution, it can be useful to make the following simplifications and optimizations. The generative model that produces the label images O[i] can be specified for a given configuration X. People can be assumed to be vertical ellipsoids with class specific heights and radii located on the ground plane. The bounding boxes represent ellipsoids constitute very crude target silhouettes in the image. Depending on the class label, bounding boxes can be subdivided into one or several parts. For example, a person silhouette can be split into equal thirds with separate body part labels assigned to the top, middle and bottom third of the bounding box. It is assumed that targets can only be located at discrete ground plane locations in the camera view, which enables precomputing the bounding boxes in the target geometry dictionary 135 to use in the evaluation of Equation 5. Still, the maximum of Equation 5 can not be found using exhaustive search since it is exponentially expensive in the number of visible targets, which is unknown.

Thus, to maximize Equation 5, a rough approximation can be used. Beginning with an empty scene in the ground plane, targets are iteratively added in a way that yields the greatest increase in the data likelihood at every iteration. To achieve real-time performance for video surveillance, several simplifying assumptions can be made. First, it can be assumed that the class and part specific histograms h(c,k)(p) can be approximated as h(p)+o(c,k), i.e., a general model plus an offset. Based on this approximation and the use of rectangular model projections described above, Equation 5 can be rewritten as sums evaluated in a single histogram image:

$$L(F_t | X) \approx \sum_j \sum_{partskofX_j} (IIS(H, B^k(X_j)) + |B^k|o_{(c,k)}), \qquad (6)$$

where $B^k(X_j)$ is the bounding box of part k of target $X_j$, IIS(H,B) the integral image of H evaluated over the bounding box B, $H[i]=h(F_t[i])$, and |B| the area of B. Since Equation 6, unlike Equation 5, disregards depth bordering and occlusion, spatial and occlusion constraints can be enforced by pruning the set of possible ground plane target locations after each estimated target location choice. Pruning can be performed by removing all target location candidates within a certain radius from the selected target location. Additional pruning can be performed by removing all candidates that exceed a certain amount of overlap with the previously selected target. Possible targets can be iteratively added beginning with the largest target in the foreground imagery. Additionally, where the target detection device is configured to detect multiple predetermined targets, such as adults, children and luggage, the likely target configuration can first be evaluated by considering possible adult targets, which are likely the largest targets in the foreground image, and then considering possible children targets and possible luggage targets.

The above approach allows the precomputation of all relevant quantities in the target geometry dictionary 135 such that the bulk of the target detection algorithm is spent on selecting locally optimal targets from the set of possible ground locations followed by spatial pruning of non-selected targets that are affected by the local choice. Further computational efficiency can be achieved by discarding target choices with negative likelihood from the set of possible choices. In practice, the average target class and location hypothesis evaluation take four memory lookups and four additions.

After the initial set of people and object detections have been obtained, the ground plane locations of target detections can be refined based on a more detailed analysis of the foreground and image content. For example, the head location of people can be searched in the scene. If no such refined location can be found, the original detection location can be used.

Figure 2:
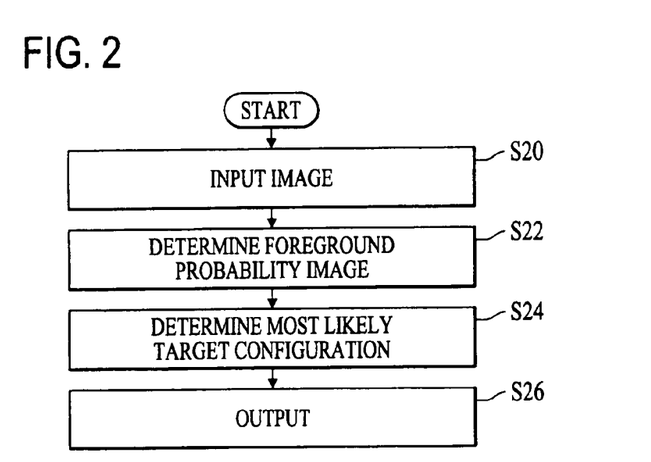
FIG. 2 is a flow chart illustrating an exemplary process for detecting targets.

An exemplary method of detecting predetermined targets using the device 100 is illustrated in FIG. 2.

The method can begin and proceed to step S20 where an image is inputted from an image source, such as a video camera. The process can proceed to step S22 where the inputted image is analyzed to determine a foreground probability image. In step S22, the foreground probability image can be processed with an a priori appearance model to filter the foreground probability image based on an appearance algorithm. Pixels having appearance attributes that are not consistent with the predetermined targets can be filtered out prior to target detection. In step S24, the extracted foreground image data is processed with a detection algorithm to determine the most likely target configuration. As described above, the algorithm used to determine the most likely target configuration can be based on geometric information that is precomputed for the predetermined targets and geometric information of the image input device. The most likely target configuration, including target identity and ground plane target location, can then be output in step S26.

Figure 3:
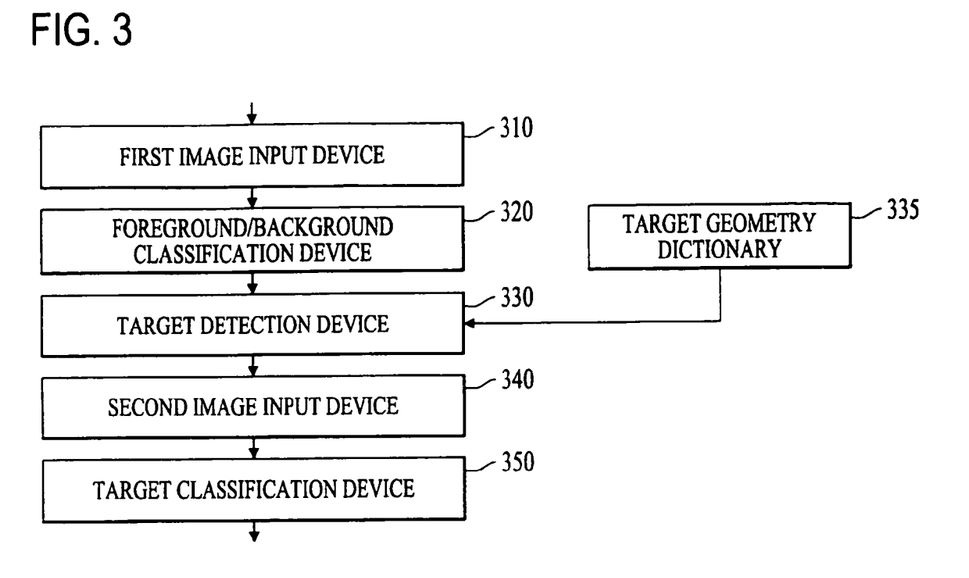
FIG. 3 is a block diagram of an exemplary target detection system.

In addition to the target detection method and device described above, the identity of detected targets can be further analyzed by obtaining a higher resolution image of the targets to determine if the target is a target of interest or not. An exemplary target detection system for obtaining high resolution images of detected targets is illustrated in FIG. 3. The target detection system 300 can include a first image input device 310, a foreground/background classification device 320, a target detection device 330, a target geometry dictionary 335, a second image input device 340, and a target detection device 350.

The first image input device 300, foreground/background image classification device 320, target detection device 330 and target geometry dictionary 335 can operate similarly to the equivalent features discussed above in connection with FIG. 1. That is, the target detection device receives an extracted foreground probability image and determines the most likely target configuration and ground plane location of predetermined targets. Based on the detected target configuration, the target detection device 330 can output target locations of detected targets to the second image input device 340.

The second image input device 340 can receive target information about all of the detected targets, or a subset of the detected targets, from the target detection device 330, to obtain a high resolution image of a detected target for further classification or verification. For example, the second image input device can be configured to obtain higher resolution images of only detected luggage to verify whether the detected target is actually luggage.

The second image input device 340 can include a pan tilt zoom camera that is directed to the estimated location of detected targets in the ground plane coordinates to obtain an image of the target having a resolution that is higher than the resolution taken from the first image input device 310. The second image input device 340 can transmit the higher resolution image to the target classification device 350.

The target classification device 350 can receive the high resolution imagery of a specific detected target in order to further determine if the detected target is a target of interest, for example to classify the target as "threat" or "no threat". The zoom cameras can also be used to further identify detected targets and suppress certain false alarms. For example, when a target is detected as an object, the zoom cameras can obtain a higher resolution image of the object to determine if the object is a newspaper or trash, which may then be classified as "no threat".

Generally, the task of local target detection is performed in each camera view, while the tracking task is performed centrally in the ground plane. The use of a ground plane-based centralized tracker that operates in the fully calibrated camera views simplifies considerations about spatial properties (such as distances) of tracks. Furthermore, the use of multiple views ensures that targets that might be occluded in one view, are still detected and tracked by the system.

Figure 4:
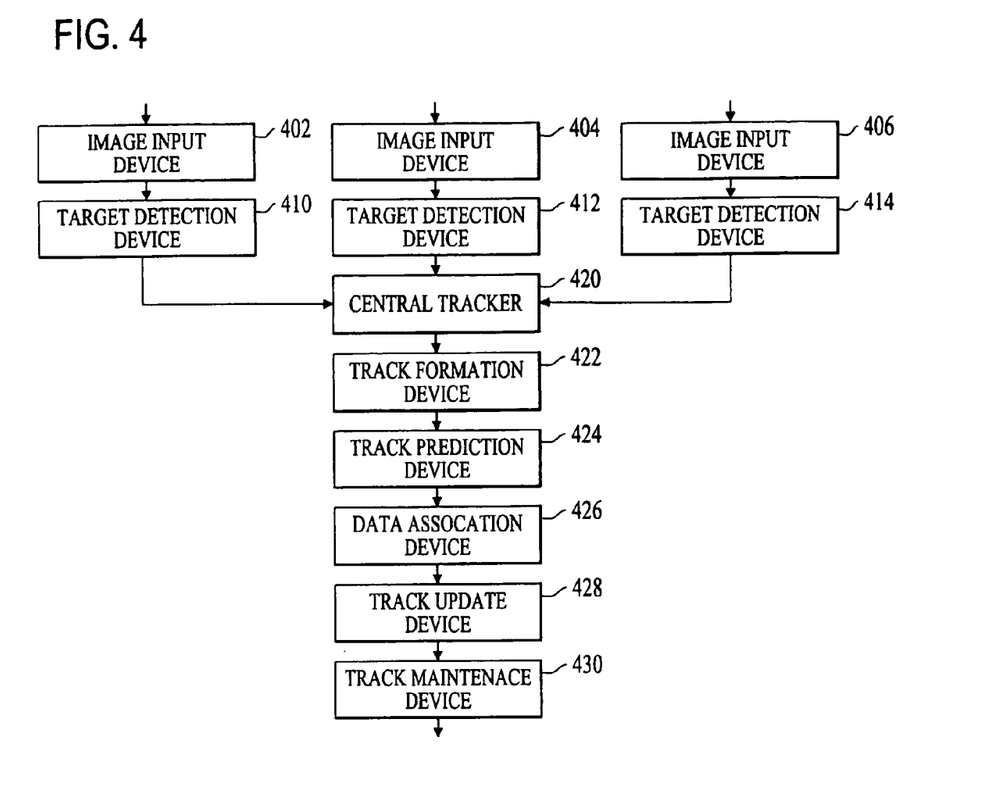
FIG. 4 is a block diagram of an exemplary target tracking system.

An exemplary target tracking system 400 is illustrated in FIG. 4. The tracking system 400 can include multiple input image devices 402, 404 and 406, multiple target detection devices 410, 412 and 414, central tracker 420, track formation device 422, track prediction device 424, data association device 426, track update device 428 and track maintenance device 430.

The tracking system 400 can be a multi-view system, such that each image input device 402, 404 and 406 can capture a unique image. The image input devices can input an image to a target detection devices 410, 412 and 414. Generally, target detection is performed locally at each image input device because target detection operates in a calibrated camera view and considers geometric information that is unique to each image input device.

The target detection devices 410, 412 and 414 can supply a list of detections at every frame to central tracker 420, where each detection contains information about the classes of the targets (for example, "person", "small-person" and "luggage") and about the target's location including location uncertainty in the image. The detector can also provide sufficient additional information that allows it to (i) project the location information into the ground plane and (ii) to recover information about the physical height and width of the target.

At every step, detections can be projected into the ground plane and can be supplied to a centralized tracker 420 that processes detections from all camera views. The system assumes that the central tracker 420 operates on physically separate processing node and can receive detections out of order from the different camera views due to for example network delays. Hence, all detections can be time stamped by each detection node according to a synchronous clock, and buffered and time re-ordered by the central tracker before processing. The sets of time ordered detections can be processed by a track formation device 422, a track prediction device 424, a data association device 426, a track update device 428, and a track maintenance device 430.

The track formation device 422 can form a new track if a detected target has not been previously associated with a track, and if it's spatial dimensions (e.g., height, width) pass a certain number of tests designed to limit the number of spurious tracks that are created.

The track prediction device 424 can receive track information from the track formation device 422 and predict the location for each track forward in time according to its current state and its dynamical model. The time stamp of the currently processed detection batch can determine how far forward in time the prediction is performed.

The data association device 426 can receive each track in the set of currently active tracks and assign each track to at most one detection using, for example, the Munkres algorithm. Application of the Munkres algorithm is described in greater detail in Burgeois et al., "An Extension of the Munkres Algorithm for the Assignment Problem to Rectangular Matrices," *Communications of the ACM,* 14:802-806 (December 1971), which is incorporated herein by reference in its entirety. The mahalanobis distance between the track and the detection can be used as the distance measure between tracks and detections, with a covariance given by the sum of the current track gate, the uncertainty of the detection and a base uncertainty. The Munkres algorithm can obtain the optimal assignment between tracks and detections under this distance measure. Tracks that are too far away from their assigned detections can be considered as nonassociated. The success of this general nearest neighbor approach to tracking depends on the performance of the detector and the clutter probability, but has been demonstrated to be sufficient for use in surveillance networks.

After assessment in the data association device 426, the track update device 428 can update tracks according to their assigned observations. If a track was assigned no observation, the update device can perform with a virtual observation that is infinitely uncertain, amounting to an update that does not correct the predicted location but increases the uncertainty of the state estimate.

In the track maintenance device 430, tracks can be marked for deletion if the state uncertainty becomes too large, if the track goes out of view (of the entire camera network) or if it has not been associated with a detection within a certain time window. After deletion, it is determined whether the track is a false alarm based on several criteria involving the lifetime of the track and its motion pattern.

The system of the present disclosure is particularly useful to track luggage or other objects. For luggage tracking, all new luggage detected can be associated with an owner using the system 400 described above, which can be defined as the person track with the shortest ground plane distance from the luggage.

In one embodiment, the system does not allow spontaneous discovery of abandoned luggage. If no person is present within a radius of $r_o$=1 meter, the luggage track can be deemed invalid. This rule can prevent the creation of spurious tracks and filters out false alarms caused by, for example, heads of tall people, since all luggage detections are projected into the ground plane, and the projection of a persons head is far away from the projection of a persons feet. The track linking stage ensures that the identity of tracks are preserved for long periods of time such that the system can robustly reason over the spatio-temporal rules of unattended and abandoned luggage. The luggage event detection system only processes a luggage track once it is stationary, defined by the location covariance over a time window of $\tau_s$=3 seconds falling below a threshold of $r_s$=0.2 meters.

For each detected luggage, the system can maintain track the ground plane distance to its owner as well as the distance to the closest person that is not the owner, if such a person exists. The system can signal a warning if an owner has a distance of more than a=2.0 meters from his luggage. The system can signal a second warning when the owner that has a distance of more than b=3.0 meters, by which time the system considers the luggage as unattended. The owner has to come back to within a radius $r_o$ be considered attending his luggage again. If a piece of luggage is unattended for more than $\tau_u$=30 s, the luggage can be considered abandoned and the system can signal an alarm.

Luggage pickup, by an owner or otherwise, can be considered to occur when a luggage track disappears or becomes non-stationary within a distance of $r_p$=1.0 meter of a person. If the owner is not within the radius of $r_p$ during pickup, the person closest to the luggage is considered the one that picks up the luggage. If somebody other than the owner picks up the luggage, a theft alarm can be signaled.

The described tracking system constitutes a generalized nearest neighbor tracker. It is computationally very efficient and hence suited for tracking a large number of targets in many camera views simultaneously. The system proved to be sufficient for the tasks of abandoned luggage detection, which requires accurate tracking of the people interacting with the luggage, but not accurately tracking people that move in groups and crowds. If accurate and persistent target tracking (even in dense groups and crowds) is desired, more sophisticated and computationally more costly approaches, such as JPDAF, MHT or Bayesian multi-target trackers can be employed.

In addition to directly detecting luggage in a scene, objects that are carried by people can be tracked, and indirect inferences can be made when the object is not detected with the associated owner. For example, during a covert a drop an object may be carried by a person before the drop, and then disappear after the covert drop. By tracking objects that are carried by people, the drop can be inferred without actually detecting the introduction of the object in a scene. This is useful in circumstances where a person may carry an object into a scene that is detected with the person, and then the person subsequently hides the object so that it is no longer detected in the scene.

Figure 5:
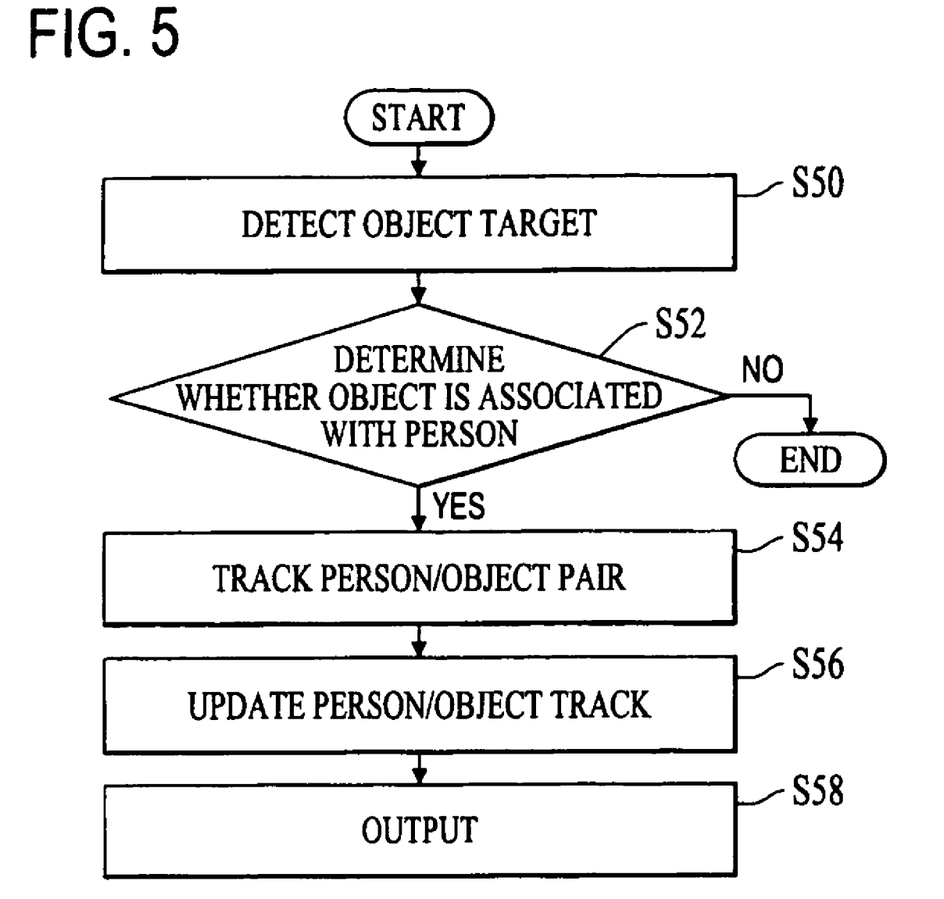
FIG. 5 is a block diagram of an exemplary method for detecting dropped objects.

An exemplary method for detecting dropped objects according to this embodiment is illustrated in FIG. 5. The method can begin and proceed to step S50 where an object target is detected in a captured image.

The process can proceed to step S52 where it is determined whether the detected object is associated with a person. The detected object can be determined to be associated with a person if the person is less than a predetermined distance from the detected object, as described above. Additionally, to avoid false detections of objects in the image that are not being carried by a person, the process can place additional restrictions on detected objects. For example, a detected object can be considered to be associated with a person only where the object stays within a certain distance of the person for predetermined amount of time, or only where the object is observed to move with the person. If a detected object is not associated with a person, the process can end.

If the detected object is associated with a person, the process can proceed to step S54 where the detected person is tracked. In step S56, the status of the person is updated to determine whether the person is still associated with the detected object. In step S56, the person can be considered to be associated with the object if the object is detected within a predetermined distance from the person. In step S58, if the object that is associated with the person is not observed or if the object is observed at too far of a distance, the object can be considered to be dropped by the person and the process can then output a determination that the object has been dropped. A warning alarm can be signaled in response to the determination that the object has been dropped.

While the disclosed methods and systems have been described in conjunction with exemplary embodiments, these embodiments should be viewed as illustrative, not limiting. It should be understood that various modifications, substitutes, or the like are possible within the spirit and scope of the disclosed devices, methods and systems.

What is claimed is:

1. A device for detecting predetermined targets of at least one class that are captured within an image that is inputted from an image input device, the device including:

a foreground/background classification device that is configured to analyze the inputted image to determine a foreground probability image that represents a probability that pixels in the inputted image are part of a foreground of the inputted image;

a target geometry dictionary including precomputed geometric size information of the predetermined targets of the at least one class; and a target detection device that is configured to analyze the foreground probability image and determine a most likely target configuration of detected targets that corresponds to the foreground probability image based on the precomputed geometric size information of the predetermined targets of the at least one class from the target geometry dictionary and based on geometric information of the image input device, wherein the geometric information of the image input device includes at least one of a focal length, height, tilt and roll angle of the image input device, and the target detection device is configured to iteratively add targets to the most likely target configuration of detected targets beginning with a largest target.

2. The device according to claim 1, wherein the target detection device is configured to determine the most likely target configuration by using an algorithm to iteratively project the predetermined targets of the at least one class at likely target locations in the foreground probability image, such that at each iteration a likelihood that the target configuration corresponds to the foreground probability image increases.

3. The device according to claim 1, wherein the foreground/background classification device is configured to determine the foreground probability image based on at least an appearance attribute of the pixels in the inputted image.

4. The device according to claim 3, wherein the foreground/background classification device is configured to determine the foreground probability image based on at least a color attribute of the pixels in the inputted image.

5. The device according to claim 1, wherein the image input device is a camera.

6. The device according to claim 1, wherein the geometric size information is defined as a bounding box having a geometry corresponding to an estimated geometry of the predetermined targets of the at least one class.

7. The device according to claim 6, wherein the bounding box is subdivided into parts having geometries corresponding to estimated geometries of parts of the predetermined targets of the at least one class.

8. The device according to claim 1, wherein the target configuration includes ground plane location information for each detected target.

9. The device according to claim 1, wherein the at least one class includes at least one of people and objects.

10. The device according to claim 1, wherein the at least one class includes adults and children.

11. The device according to claim 1, wherein the at least one class includes luggage.

12. A method for detecting predetermined targets of at least one class that are captured within an image that is inputted from an image input device, the method including:
analyzing the inputted image to determine a foreground probability image that represents a probability that pixels in the inputted image are part of a foreground of the inputted image;
precomputing geometric size information of the predetermined targets of the at least one class;
analyzing the foreground probability image and determining a most likely target configuration of detected targets that corresponds to the foreground probability image based on the precomputed geometric size information of the predetermined targets of the at least one class and based on geometric information of the image input device; and
iteratively adding targets to the most likely target configuration of detected targets beginning with a largest target, wherein
the geometric information of the image input device includes at least one of a focal length, height, tilt and roll angle of the image input device.

13. The method according to claim 12, wherein the most likely target configuration is determined by using an algorithm to iteratively project predetermined targets of the at least one class at likely target locations in the foreground probability image, such that at each iteration a likelihood that the target configuration corresponds to the foreground probability image increases.

14. The method according to claim 12, wherein the foreground probability image is determined based on at least an appearance attribute of the pixels in the inputted image.

15. The method according to claim 14, wherein the foreground probability image is determined based on at least a color attribute of the pixels in the inputted image.

16. The method according to claim 12, wherein the target configuration includes ground plane location information for each detected target.

17. A target detection system for detecting predetermined targets of at least one class, the system including:
a first image input device that is configured to obtain a first image including the predetermined targets of the at least one class;
a foreground/background classification device that is configured to analyze the first image to determine a foreground probability image that represents a probability that pixels in the first image are part of a foreground of the inputted image;
a target geometry dictionary including precomputed geometric size information of the predetermined targets;
a target detection device that is configured to analyze the foreground probability image and determine a most likely target configuration of detected targets that corresponds to the foreground probability image based on the precomputed geometric size information of the predetermined targets of the at least one class from the target geometry dictionary and based on geometric information of the first image input device, wherein
the target configuration includes ground plane location information for each detected target and the geometric information of the first image input device includes at least one of a focal length, height, tilt and roll angle of the first image input device, and
the target detection device is configured to iteratively add targets to the most likely target configuration of detected targets beginning with a largest target; and
a second image input device that is configured to receive the ground plane location information of a detected target of interest from the target detection device and obtain a second image that captures the detected target of interest using the ground plane location information, wherein the second image has a higher resolution than the first image; and
a target classification device that is configured to receive the second image and classify the detected target of interest based on at least the second image.

18. The system according to claim 17, wherein the second image input device is a pan tilt zoom camera.

19. The system according to claim 17, wherein the detected target of interest is an object.

20. The system according to claim 17, wherein the target classification device is configured to classify whether the detected target of interest is a threat.

21. A method for detecting and tracking predetermined people targets and object targets over a camera network to determine whether an object is dropped by a person, the method including:
analyzing an image captured by a camera to determine a foreground probability image that represents a probability that pixels in the image are part of a foreground of the image;
precomputing geometric size information for the predetermined people targets and object targets;
analyzing the foreground probability image and determining a most likely target configuration of detected targets that corresponds to the foreground probability image based on the precomputed geometric size information of the predetermined people targets and object targets and based on geometric information of the camera, wherein the most likely target configuration includes a detected object target and a detected person target and the geometric information of the camera includes at least one of a focal length, height, tilt and roll angle of the camera;

iteratively adding targets to the most likely target configuration of detected targets beginning with a largest target;

determining whether the detected object target is associated with the detected person target;

tracking the detected object target and the detected person target over the camera network if it is determined that the detected object target is associated with the detected person target; and determining that the detected object target has been dropped if the detected person target is subsequently tracked without the detected object target.

22. The method according to claim 21, wherein the detected object target is determined to be associated with the detected person target if the detected object target is located within a predetermined distance of the detected person target.

23. The method according to claim 21, wherein the detected object target is determined to be associated with the detected person target if the detected object target is located within a predetermined distance of the detected person target for longer than a predetermined amount of time.

24. The device according to claim 2, wherein the target detection device is configured to remove target location candidates within a predetermined radius of one of the likely target locations.

25. The device according to claim 1, wherein the target detection device is configured to remove a target from the most likely target configuration of detected targets which exceeds a predetermined amount of overlap with a previously selected target.

* * * * *

UNITED STATES PATENT AND TRADEMARK OFFICE
CERTIFICATE OF CORRECTION

PATENT NO. : 8,320,613 B2
APPLICATION NO. : 12/155438
DATED : November 27, 2012
INVENTOR(S) : Nils O. Krahnstoever et al.

It is certified that error appears in the above-identified patent and that said Letters Patent is hereby corrected as shown below:

Title Page, Item (75) Inventors:
Please correct the first Inventor's name so that it appears on the patent as follows:

~~Nils Krahnstoever~~ Nils O. Krahnstoever

Signed and Sealed this
Fifth Day of February, 2013

Teresa Stanek Rea
*Acting Director of the United States Patent and Trademark Office*